Dec. 4, 1928.
Z. WIRT
1,694,156
REFRIGERATING APPARATUS
Filed Nov. 7, 1923
2 Sheets-Sheet 2
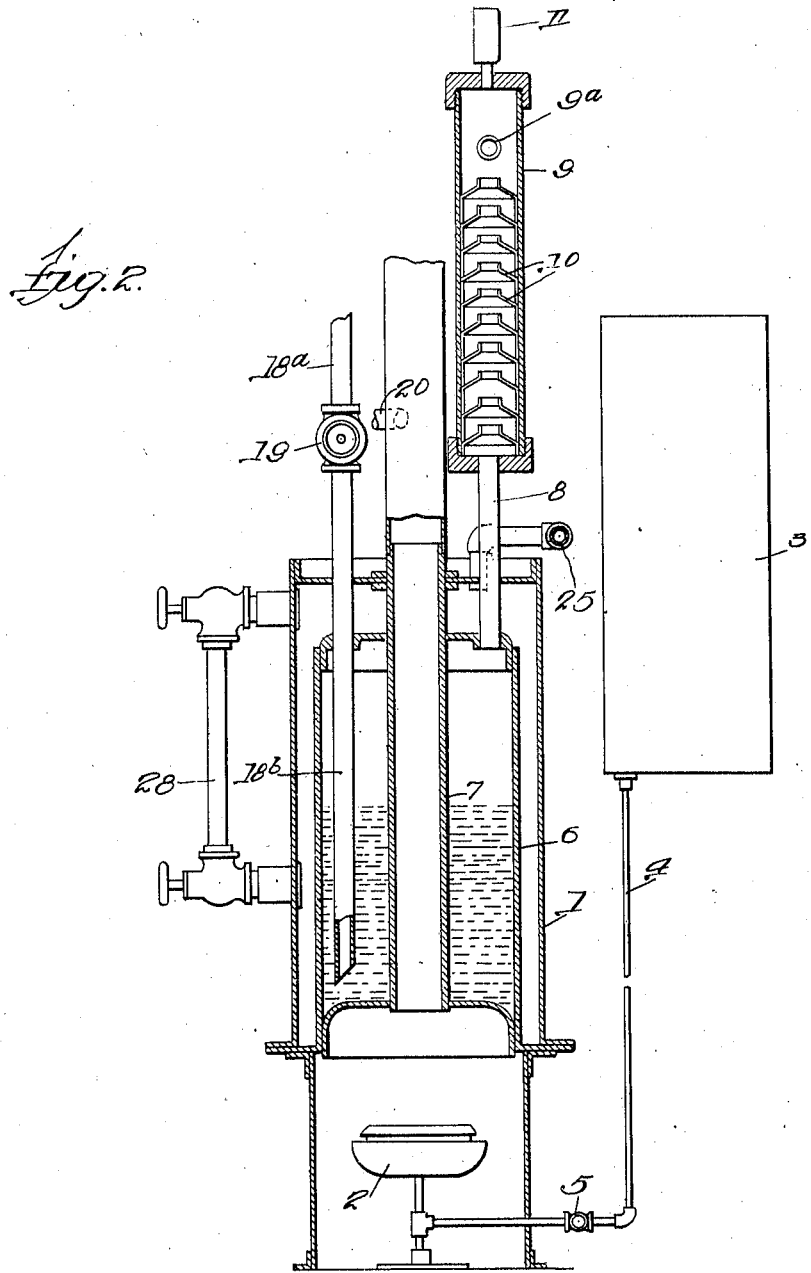

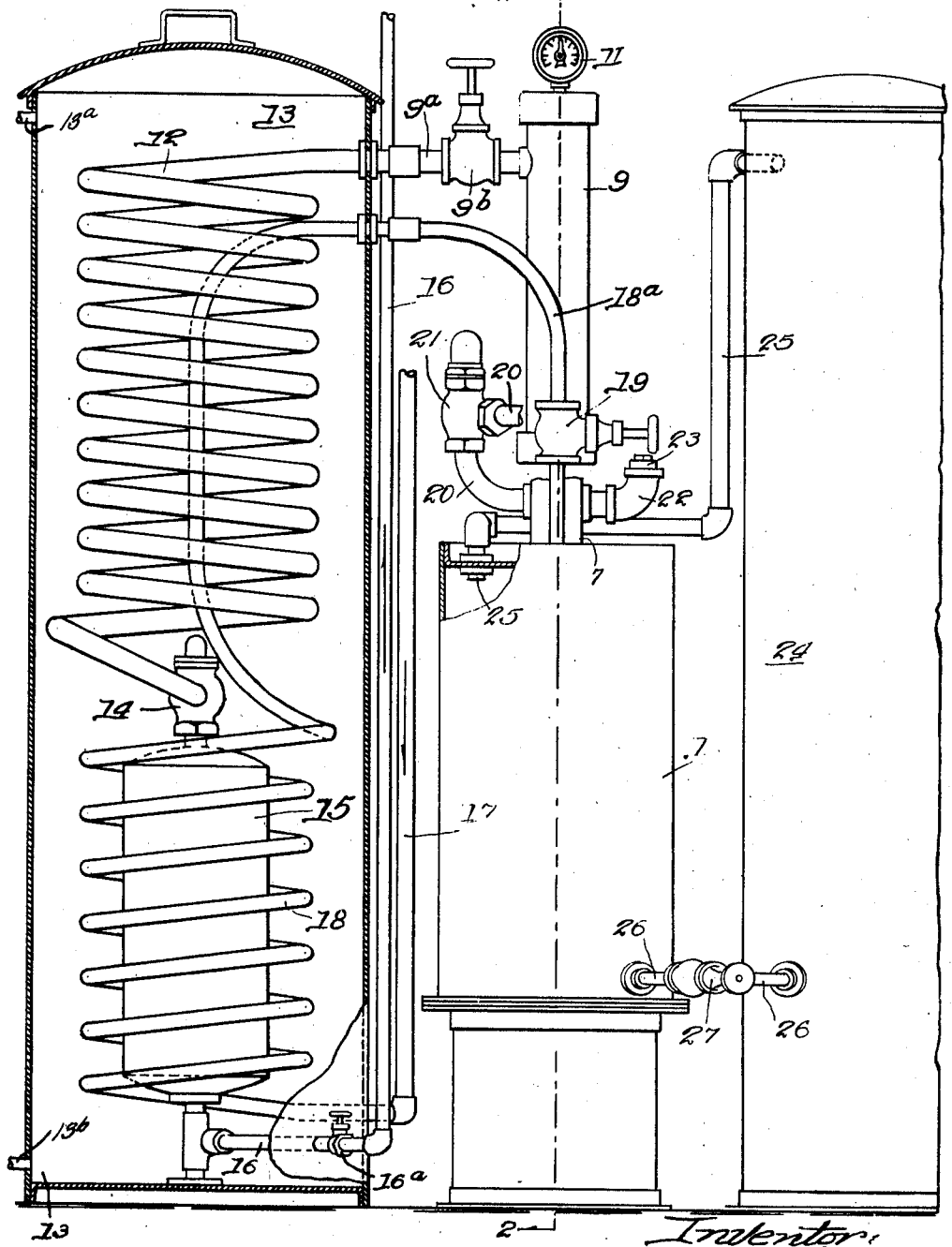

Patented Dec. 4, 1928.

1,694,156

UNITED STATES PATENT OFFICE.

ZEBULON WIRT, OF OMAHA, NEBRASKA.

REFRIGERATING APPARATUS.

Application filed November 7, 1923. Serial No. 673,350.

This invention relates to a refrigerating apparatus and has for its object to provide a new and improved device of this description. The invention has as a further object to provide a refrigerating apparatus of the absorption type using some suitable cooling agent such as ammonia which is continuously used by being changed from liquid to gas and gas to liquid, and which is so constructed as to be cheap, and simple in construction, and which can be operated at a low cost. The invention has further objects which are more particularly pointed out in the accompanying description.

Figure 1 is a side elevation of one form of apparatus embodying the invention with parts broken away.

Figure 2 is a vertical sectional view on line 2—2 through the device illustrated in Figure 1.

Like numerals refer to like parts throughout the several figures.

Referring now to the drawings, a generator absorber 1 is provided, wherein the refrigerating material used, such as ammonia, is heated so as to be converted into a gas.

I have illustrated this generator absorber as being provided with a heater 2, which may be of any suitable description. For purpose of illustration I have shown this heater as an oil heater supplied with fuel from the tank 3 through the pipe 4, the oil being controlled by the valve 5. The generator absorber 1 is shown as a water-jacketed construction having the inner refrigerant container 6, the space between the container 6 and the outer shell 1 being space for the water. The gas from the heater passes up through the central flue 7 to some suitable point of discharge. The refrigerant after being heated and converted into a gas passes up through the pipe 8 into the tubular rectifier cylinder 9 containing suitable baffles 10 for the purpose of extracting and returning the moisture from the evaporated refrigerant. The baffles in the rectifier are of a form that affords a zone of lower pressure, or slower flow of gases and the moisture being of higher specific gravity than the refrigerating gas condenses more freely and collects in the area of reduced turbulence or flow and returns in the generator absorber along the outer walls of the rectifier cylinder, and pipe connections.

This rectifier cylinder is provided with a suitable vacuum and pressure gauge 11. The gaseous refrigerant passes from the rectifier cylinder 9 through the pipe $9^a$, controlled by the valve $9^b$, and into the condensing coil 12, contained in the cooling receptacle 13, thence through the vertical check valve 14 through the receiver 15. The coil 12, and the receiver 15 are cooled by some cooling medium as being submerged in water. The receptacle 13, for example, may have the water inlet and outlet $13^a$ and $13^b$ for the circulation of the water therethrough. The liquefied refrigerant then passes from the receiver 15 into the pipe 16, controlled by the valve $16^a$, and thence to the expansion valve and coils (not shown), which may be of any suitable type depending upon the particular use to which the refrigerant is applied. The refrigerant is then returned through pipe 17 to the bottom of the cooling receptacle 13, and thence through the coil 18 in the cooling chamber and thence by pipe $18^a$ to the generator absorber pipe $18^b$, being controlled by valve 19. Any suitable absorbent material is used in the generator absorber, and the pipe $18^b$ extends beneath the surface thereof and near the bottom of the container 6. This coil 18 is for the purpose of equalizing (reducing) the temperature of the returned expanded refrigerant before it enters the generator absorber. The refrigerant is again heated in the generator absorber and passed through the cycle above set out. When the refrigerent is being heated the valve 19 is closed and the valve $9^b$ open and while the absorption is taking place the valve $9^b$ is closed and the valve 19 open. There is a connection 20 from the generator absorber and the rectifier 9 to the flue 7 and in this connection there is a relief valve 21 so that when the pressure reaches a predetermined amount the pressure will be relieved by a discharge into the flue 7. New refrigerant may be inserted into the generator absorber through the filling connection 22 having the closing plug 23. Where flowing water is not accessible there is provided a siphon tank 24 containing water for cooling the generator absorber 1. This siphon tank is connected to the water jacket of the generator absorber by the pipes 25 and 26, controlling valve 27 is provided for controlling these sections. The generator absorber is provided with a suitable water gauge 28 to indicate the height of the liquid therein.

I claim:

A device of the kind described comprising a generator absorber having an inner container for the refrigerant material, means for heating said inner container, an outer shell, means for circulating water between the inner container and the outer shell, and a rectifier connected with said inner container, a flue for the heater extending up through the inner container and a connection between the inner container and said flue, said connection being provided with a relief valve.

Signed at Omaha, county of Douglas and State of Nebraska, this 3rd day of November, 1923.

ZEBULON WIRT.